United States Patent

[11] 3,604,625

[72] Inventor William J. Waeldner
 Waverly, Pa.
[21] Appl. No. 873,524
[22] Filed Nov. 3, 1969
[45] Patented Sept. 14, 1971
[73] Assignee Dynamics Corporation of America
 New York, N.Y.

[54] AIRFLOW MIXING DEVICE FOR AIR CONDITIONING SYSTEMS
12 Claims, 5 Drawing Figs.

[52] U.S. Cl. .................................................... 236/13,
 98/38, 137/607
[51] Int. Cl. ...................................................... G05d 23/08
[50] Field of Search ........................................... 98/38 E, 38
 B, 38; 236/13; 137/607

[56] References Cited
UNITED STATES PATENTS
3,114,505  12/1963  Kennedy ..................... 236/13
3,516,606  6/1970   Edwards ...................... 236/13

*Primary Examiner*—Meyer Perlin
*Assistant Examiner*—Ronald C. Capossela
*Attorney*—McCormick, Paulding & Huber

ABSTRACT: An airflow mixing device for "air reheat" air-conditioning systems comprising a primary air conduit with an airflow regulator having a pair of swingable variable-flow vanes and a pair of swingable constant-flow vanes. A variable area jet orifice is provided downstream of the regulator with an additional pair of swingable vanes and opposing induction air inlets are provided adjacent the orifice. All vanes are operated by one or more air motors under thermostatic control simultaneously to increase primary airflow and decrease induction airflow and when the latter is reduced to a minimum, valves in the induction inlets are closed to terminate completely the induction flow.

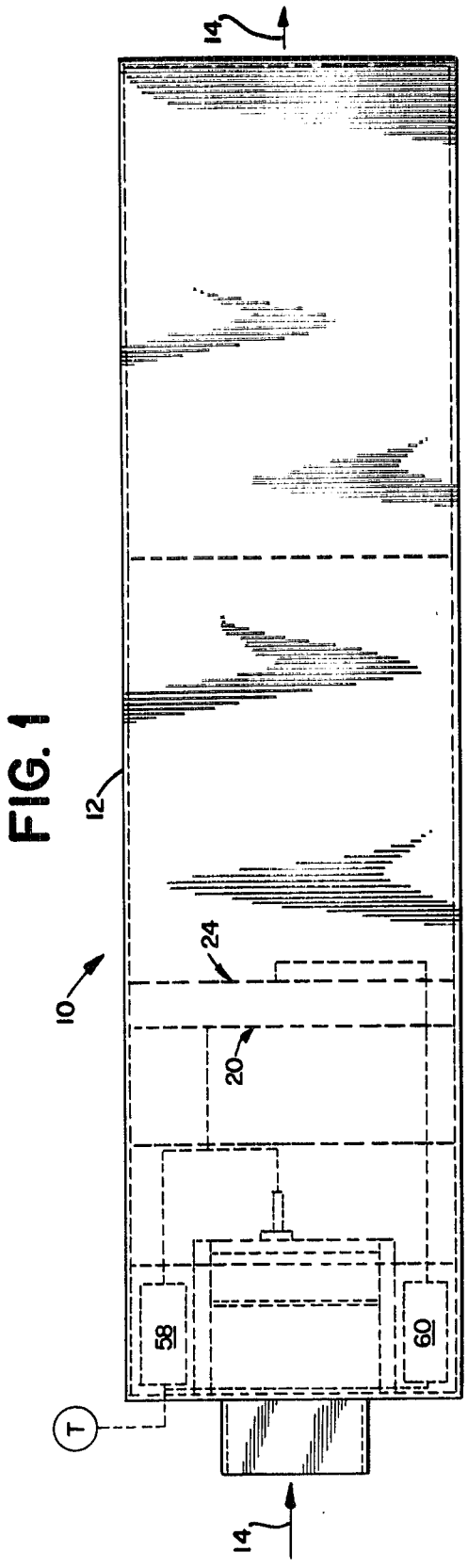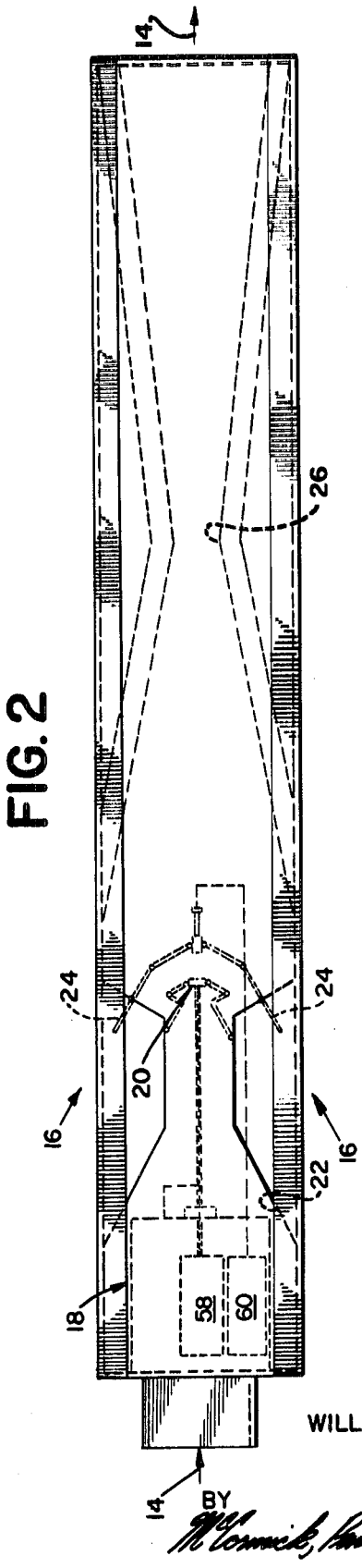

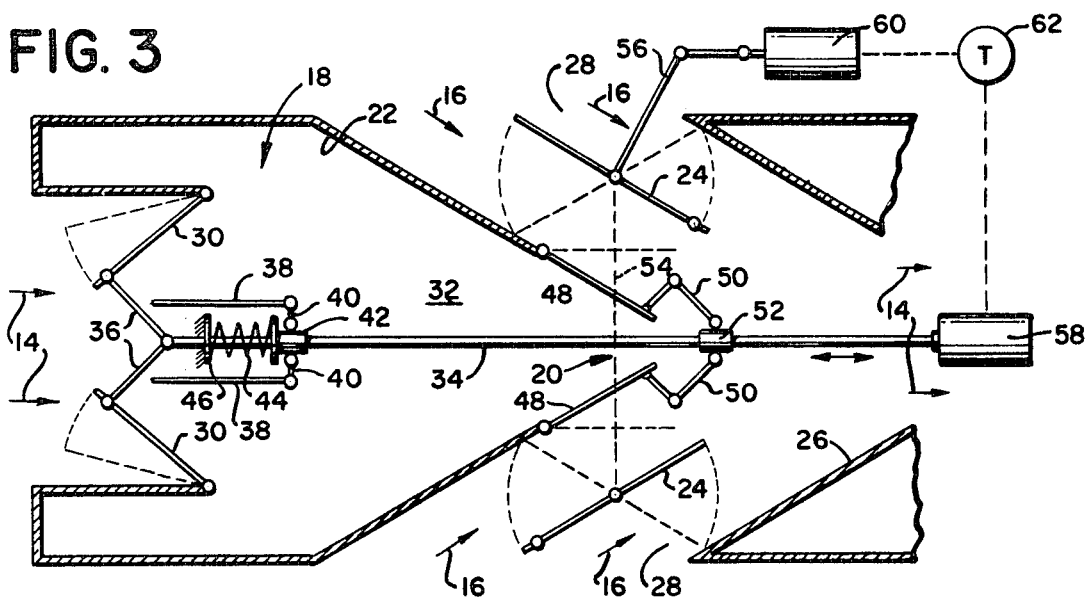
FIG. 3
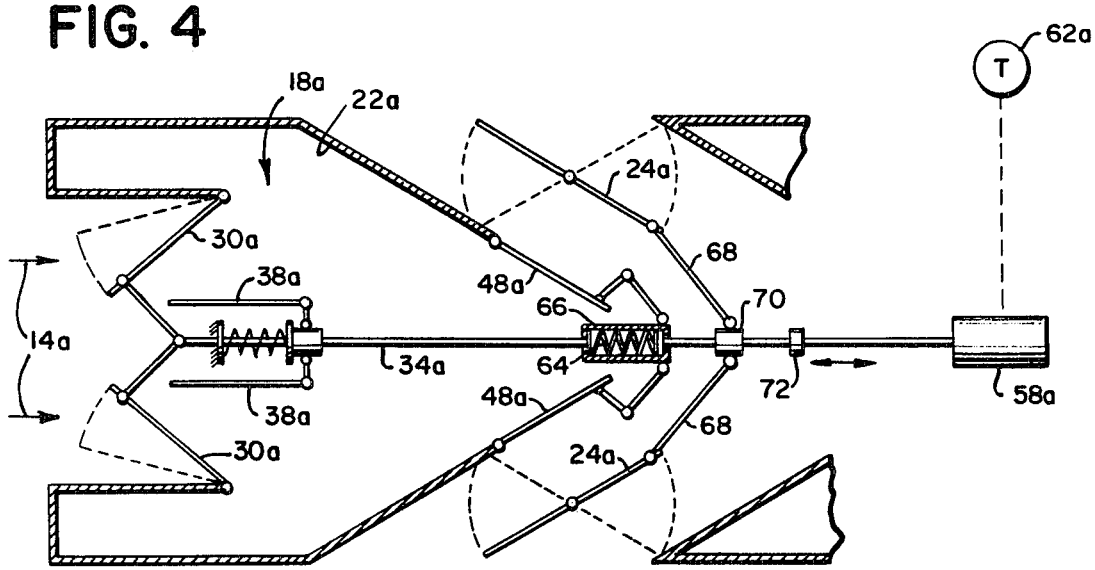
FIG. 4
| INDUCTION DAMPER | PRIMARY CFM | INDUCED CFM | TOTAL CFM | JET VELOCITY | JET AREA |
|---|---|---|---|---|---|
| OPEN | 200 | 200 | 400 | 4000 | .05 |
| OPEN | 250 | 160 | 410 | 3500 | .075 |
| OPEN | 300 | 120 | 420 | 3000 | .1 |
| OPEN | 350 | 70 | 420 | 2500 | .15 |
| OPEN | 400 | 40 | 440 | 2000 | .2 |
| CLOSING | 400 | 20 | 420 | 2000 | |
| CLOSED | 400 | 0 | 400 | 2000 | |
FIG. 5

AIRFLOW MIXING DEVICE FOR AIR CONDITIONING SYSTEMS

BACKGROUND OF THE INVENTION

In air-conditioning systems, it is conventional practice to temper primary or conditioned air with electrical heaters or an "air reheat." This invention relates to the latter type of system wherein air from a plenum above a false ceiling, or other warm air, is employed to temper primary or conditioned air prior to delivery to a room or other enclosure. Further, the invention relates to an "air reheat" air-conditioning system wherein plenum or other warm air is induced to flow into a mixing device by means of a primary or conditioned air jet. Air-mixing devices of this general type have been provided as illustrated by Kennedy U.S. Pat. No. 3,114,505 issued Dec. 17, 1963, entitled AIR-CONDITIONING APPARATUS. Such devices have not however been entirely satisfactory. Imprecise control of primary or conditioned airflow has been encountered together with substantial inlet pressure requirements.

SUMMARY OF THE INVENTION

It is the general object of the present invention to provide an air-mixing device of the type mentioned wherein provision is made for precise control of primary and induction airflow, and wherein fan energy is conserved and inlet pressure requirements minimized.

In fulfillment of this object an air-mixing device is provided with a conduit which includes an airflow regulator having both variable-and constant-flow valve members or vanes. The variable-flow vanes are moved to establish desired rates of primary or conditioned airflow and the constant-flow vanes operate automatically to maintain such established rates constant over the full range of inlet static pressure conditions encountered in normal system operation. Downstream of the primary airflow regulator, a variable primary air jet orifice is provided with at least one valve member and, preferably with a pair of swingable vanes. At least one and preferably a pair of opposing induction air inlets are arranged adjacent the jet orifice whereby the primary air jet induces an airflow through the inlets for intermixture with primary or conditioned air in the conduit. Operating means provide for movement of the variable-flow vanes and the orifice vanes in unison but with opposite effect. Thus, as the variable-flow vanes are moved to increase primary or conditioned air flow the orifice vanes are moved to increase orifice area, decrease jet velocity, and to reduce induced airflow. Similarly, when primary or conditioned airflow is reduced, the orifice vanes are moved in a closing direction to increase primary air jet velocity and to thereby increase induced airflow. At the condition of maximum primary airflow and minimum induced airflow, additional valve members in the induction inlets are closed whereby to terminate completely induction flow.

From the foregoing it will be apparent that precise control is provided over primary airflow and induction airflow. Further, at the condition of maximum primary airflow, the orifice vanes provide a minimum primary air jet velocity for minimum induced airflow thus conserving fan energy and minimizing inlet pressure requirement.

BRIEF DESCRIPTION OF DRAWINGS

FIG. 1 is a top view of an air-mixing device constructed in accordance with the present invention.

FIG. 2 is a side view of the air-mixing device.

FIG. 3 is schematic illustration of the various valve members or vanes and their operating means, the valve member and operating means arrangement constituting a first embodiment of the invention.

FIG. 4 is a schematic illustration similar to FIG. 3 but showing a valve member and operating means arrangement constituting a second embodiment of the invention.

FIG. 5 is a tabular presentation of various primary and induced airflow conditions, orifice areas, jet velocities etc.

DESCRIPTION OF THE PREFERRED EMBODIMENTS

Referring first to FIGS. 1 and 2, it will be observed that an air-mixing device illustrated generally at 10 comprises a conduit 12 which may vary widely in cross section but which is preferably of rectangular cross section as shown. Arrows 14, 14 indicate the direction of primary or conditioned airflow through the mixing device and arrows 16, 16 indicate induction airflow into the device from a false ceiling plenum or other source. An airflow regulator is indicated generally at 18 for varying the rate of flow of primary air and a primary air jet orifice indicated generally at 20 is located downstream of the regulator and converging conduit section 22. As stated above, at least one induction inlet is provided with a valve member therein, and when a pair of opposing induction inlets are provided as shown, valve members are provided therein at 24, 24. When remote delivery of intermixed primary and induction air is to be provided for, a venturi section such as 26 is preferably provided in the mixing device downstream of the jet orifice 20.

Referring now particularly to FIG. 3, it will be noted that reference numerals are applied in a manner similar to FIGS. 1 and 2, induction inlets associated with the arrows 16, 16 being identified at 28, 28. The airflow regulator 18 establishes and maintains precise primary airflow rates over a selected range and is fully described and illustrated in copending application Ser. No. 732,596, now abandoned, FLOW REGULATOR FOR AIR-CONDITIONING SYSTEMS, filed May 28, 1968, in the names of William J. Waeldner, John F. Lynch and Robert P. Drazba. The regulator includes at least one variable-flow valve member and preferably comprises a pair of such members in the form of similar cooperating swingable and generally rectangular vanes 30, 30. As shown, the vanes 30, 30 are hinged at their downstream edges for swingable movement in the conduit 32 outwardly in a conduit-opening direction and inwardly in a conduit-closing direction. An operating means for the vanes includes an elongated actuating rod 34 arranged longitudinally in the conduit and movable lengthwise. Connecting means between the rod and the vanes 30, 30 is shown schematically in the form of links 36, 36.

The primary airflow regulator 18 also comprises at least one variable-flow valve member shown in the form of a second pair of cooperating swingable and generally rectangular vanes 38, 38. The vanes are hinged at their downstream edges and have operating links 40, 40 connected with a small slide 42 on the rod 34. The slide 42 is urged rightwardly by a spring 44 fixed at 46 whereby to urge the variable vanes 38, 38 toward each other and in a conduit-opening direction. Air pressure on the inner surface of the vanes urges the same away from each other and in a conduit-closing direction against the bias of spring 44. Thus, the vanes 38, 38 are operated automatically to maintain a substantially constant flow rate on establishment of such rate by movement of the vanes 30, 30.

A means defining a jet orifice in FIG. 3 comprises converging conduit section 22 and a pair of similar cooperating generally rectangular orifice vanes 48, 48. As will be apparent, the orifice 20 is substantially smaller in cross section than the conduit 32 whereby to provide a primary air jet having a velocity variable with the area of the orifice as established by the position of the vanes 48, 48. The vanes 48, 48 are hinged at upstream edges and have associated links 50, 50 pivotally connected with the actuating rod 34 at a collar 52. Outward, or orifice area increasing movement of the vanes 48, 48 results in decreasing jet velocity and in a decreased flow of induced air through the inlets 28, 28. Conversely, when the vanes 48, 48 are swung inwardly toward each other, the primary air jet velocity is increased and an increased induction airflow will result.

Valve members 24, 24 arranged respectively in the induction air inlets 28, 28 are normally open and perform an induction air shutoff function when induced airflow is reduced to a minimum and is not needed in satisfaction of system requirements. Valve member interconnection is indicated by broken line 54 and link 56 is illustrated schematically for valve member operation in unison.

In the FIG. 3 embodiment, the aforesaid operating means preferably includes first and second motors 58, 60 operable sequentially. Further, it is preferred that the motors be fluid pressure-operated and, more specifically, air motors, with the first motor 58 operating the actuating rod 34 whereby simultaneously to position the variable-flow vanes 30, 30 and the orifice vanes 48, 48. The second motor 60 operates the air induction inlet valve members 24, 24.

For automatic system operation, a thermostat 62 may be located in a room or enclosure served by the mixing device and is connected in operative relationship with the air motors 58, 60. Preferably, a pneumatic thermostat is provided and provides air pressure signals over a first range of pressures for operation of the motor 58 and over a second range of pressures for operation of the motor 60. For example, a direct acting pneumatic thermostat may be provided with a 0–10 p.s.i. overall pressure range, pressure increasing with increasing room or enclosure temperature. Thus, from 0–5 p.s.i. primary or conditioned air may be tempered in equal proportion by induced air, the actuating rod 34 being maintained in a rightward position by the air motor 58 and the vanes 30, 30 and the vanes 48, 48 maintained in positions of minimum opening. Under such conditions, primary and induced flow may be maintained at 200 c.f.m. each, jet velocity at a maximum with jet orifice area at a minimum, FIG. 5. Between 5 p.s.i. and 7½ p.s.i. leftward movement of actuating rod 34 and increasing opening of the variable flow and orifice vanes 30, 30 and 48, 48 will result in increasing primary flow, with a simultaneous increase in jet orifice area. This decreases the jet velocity to cause a decrease in induced airflow in order to maintain a substantially constant total airflow rate as shown in FIG. 5. At 7½ p.s.i. for example, the vanes 30, 30 and 48, 48 having reached terminal open positions, the motor 60 will operate in the range 7½ to 10 p.s.i. whereby to close the valve members 24, 24 and to terminate completely induction airflow proving maximum cooling to the room or other enclosure.

In the FIG. 4 embodiment of the invention, reference numerals correspond with those of FIG. 3 but with the suffix "*a*." A single motor 58*a* is provided and a actuating rod 34*a* is provided with an override spring 64 within a small cylinder 66. Valves 24*a*, 24*a* are connected by links 68, 68 with a slide 70 on actuating rod 34*a*. A fixed collar 72 on the actuating rod engages and moves the slide 70 on leftward rod movement beyond the open terminal positions of vanes 30*a*, 30*a* and 48*a*, 48*a*, override spring 64 accommodating such additional rod movement. Thus, with a 0–10 p.s.i. thermostat 62*a* operation may be precisely the same as described above for FIG. 3 and illustrated in FIG. 5. When the vanes 30*a*, 30*a* and 48*a*, 48*a* reach terminal open positions continued leftward actuating rod movement in the range 7½ to 10 p.s.i. is permitted by the override spring 64 whereupon the collar 72 engages the slide 70 to close the induction inlet valve members 24*a*, 24*a* and to provide maximum cooling.

I claim:

1. An airflow mixing device for use in a false ceiling plenum or the like in an air reheat air-conditioning system, said device comprising a conduit for conducting a flow of primary air under pressure, an airflow regulator in said conduit including at least one variable-flow valve member and at least one constant-flow value member, said variable-flow valve member being movable in conduit-opening and -closing directions to vary the rate of primary airflow, and said constant-flow valve member being movable in conduit-opening and -closing directions and having associated means for automatic operation whereby to maintain primary airflow substantially constant at any one flow rate established by said variable-flow valve member, at least one induction air inlet in said conduit downstream of said airflow regulator, means defining a jet orifice substantially smaller in cross-sectional area than said conduit, said orifice being arranged adjacent said induction air inlet whereby to provide a primary air jet for inducing an airflow through said inlet for intermixture with primary air in said conduit, and said orifice-defining means including at least one member movable in opening and closing directions for varying orifice area whereby to vary jet velocity and thus to vary the rate of air induction through said inlet, operating means for moving said variable-flow valve member and said orifice-varying member in opening directions in unison but at different rates whereby simultaneously to increase primary airflow and decrease induced airflow, said means serving also to move said members in closing directions in unison for decreasing primary airflow and increasing induced airflow, and a valve member in said induction air inlet, said operating means being connected with and operable to maintain said valve member open during the aforesaid movement of said variable-flow valve member and said orifice-varying member and operable further to move said valve member to close the induction inlet only when said variable-flow valve member and said orifice-varying member have been moved in unison to terminal positions in the aforesaid opening directions.

2. An airflow mixing device as set forth in claim 1 wherein a thermostat is provided for automatic control of said operating means.

3. An airflow mixing device as set forth in claim 1 wherein a venturi section is provided in said conduit downstream of said orifice and induction inlet for increased efficiency in delivery of intermixed primary and induction air to a remote location.

4. An airflow mixing device as set forth in claim 1 wherein said conduit is of generally rectangular cross section, and wherein said airflow regulator comprises a pair of variable-flow valve members in the form of similar cooperating swingable and generally rectangular vanes and a pair of constant-flow valve members in the form of similar cooperating swingable and generally rectangular vanes.

5. An airflow mixing device as set forth in claim 4 wherein a pair of induction air inlets are provided on opposite sides of said conduit, and wherein said orifice-defining means comprises a pair of similar generally rectangular vanes swingable toward and away from each other respectively to decrease and increase orifice area.

6. An airflow mixing device as set forth in claim 5 wherein a convergent section is provided in said conduit between said airflow regulator and said orifice vanes.

7. An airflow mixing device as set forth in claim 5 wherein said operating means comprises an elongated actuating rod disposed longitudinally in said conduit and having portions adjacent said pair of variable-flow vanes and said pair of orifice vanes, and wherein said operating means also comprises connecting means between said variable-flow vanes and said actuating rod thus serving to operate said two pairs of vanes in unison as aforesaid.

8. An airflow mixing device as set forth in claim 5 wherein each of said induction air inlets is provided with a normally open movable valve member, and wherein said two valve members are connected with said operating means, the latter serving to operate the valve members as aforesaid whereby to close the induction inlets only when said variable-flow vanes and said orifice vanes are moved in unison to terminal positions in the aforesaid opening directions.

9. An airflow mixing device as set forth in claim 8 wherein said operating means comprises a first motor and an associated actuating means connected with and operating both said variable-flow vanes and said orifice vanes, and a second motor and an associated actuating means connected with and operating said two inlet valve members.

10. An airflow mixing device as set forth in claim 9 wherein said first and second motors are fluid pressure operable over different ranges of fluid pressure, and wherein a thermostat is connected with said motors and provides fluid pressure signals thereto for operation of said first motor over a first fluid pressure range and operation of said second motor over a second fluid pressure range.

11. An airflow mixing device as set forth in claim 8 wherein said operating means comprises a single motor and an associated actuating means connected with said variable flow vanes, said orifice vanes, and said inlet valve members.

12. An airflow mixing device as set forth in claim 11 wherein said motor is fluid pressure operable, and wherein a thermostat is connected with said motor and provides fluid pressure signals thereto over a range of fluid pressures, said actuating means serving to operate said variable-flow vanes and said orifice vanes as aforesaid over a first portion of said range of pressures, and said actuating means serving to operate said inlet valve members as aforesaid over a second portion of said range of pressures.